US011125149B2

(12) United States Patent
Kato

(10) Patent No.: US 11,125,149 B2
(45) Date of Patent: Sep. 21, 2021

(54) INTAKE DEVICE OF INTERNAL COMBUSTION ENGINE

(71) Applicant: SUBARU CORPORATION, Tokyo (JP)

(72) Inventor: Masaaki Kato, Tokyo (JP)

(73) Assignee: SUBARU CORPORATION

( * ) Notice: Subject to any disclaimer, the term of this patent is extended or adjusted under 35 U.S.C. 154(b) by 145 days.

(21) Appl. No.: 16/375,443

(22) Filed: Apr. 4, 2019

(65) Prior Publication Data

US 2019/0353092 A1 Nov. 21, 2019

(30) Foreign Application Priority Data

May 17, 2018 (JP) .............................. JP2018-095750

(51) Int. Cl.
*F02B 31/04* (2006.01)
*F02F 1/42* (2006.01)
*F02B 31/00* (2006.01)

(52) U.S. Cl.
CPC ................ *F02B 31/04* (2013.01); *F02F 1/42* (2013.01); *F02B 2031/006* (2013.01)

(58) Field of Classification Search
CPC .... F02B 31/04; F02B 2031/006; F02B 31/06; F02B 2275/48; F02B 31/08; F02F 1/42; F02F 1/425; F02F 1/4214; F02F 1/4235; Y02T 10/12; F02M 35/108; F02M 35/10
See application file for complete search history.

(56) References Cited

U.S. PATENT DOCUMENTS

| 4,945,869 | A   | * | 8/1990 | Klomp | .................... | F02B 33/04 |
|           |     |   |        |       |                      | 123/73 V   |
| 6,868,823 | B2  | * | 3/2005 | Sakai | ...............      | F02M 35/10222 |
|           |     |   |        |       |                      | 123/306    |
| 7,762,229 | B2  | * | 7/2010 | Abe   | .......              | F02F 1/4242 |
|           |     |   |        |       |                      | 123/306    |
| 8,997,721 | B2  | * | 4/2015 | Yamamoto | .......           | F02M 35/10118 |
|           |     |   |        |       |                      | 123/590    |
| 10,533,526 | B2 | * | 1/2020 | Yamaguchi | ......           | F02M 35/10321 |
| 2004/0226536 | A1 | * | 11/2004 | Sakai | ........          | F02F 1/38  |
|           |     |   |        |       |                      | 123/308    |

FOREIGN PATENT DOCUMENTS

JP          2007-309275 A      11/2007

* cited by examiner

*Primary Examiner* — Joseph J Dallo
*Assistant Examiner* — Kurt Philip Liethen
(74) *Attorney, Agent, or Firm* — McGinn I.P. Law Group, PLLC

(57) ABSTRACT

An intake device of an internal combustion engine includes a partition, a control valve, and a third passage. The partition divides an interior of an intake pipe that couples with a combustion chamber into a first passage and a second passage. The control valve is capable of opening and closing the first passage. The third passage opens at or near a coupling site between the partition and the intake pipe on an inner face of the second passage. The third passage is configured to be capable of sucking in at least a part of a boundary layer produced at or near the coupling site by a vapor flowing through the second passage in a state in which the control valve is working in a direction of closing the first passage.

20 Claims, 11 Drawing Sheets

INTAKE DEVICE OF INTERNAL COMBUSTION ENGINE

CROSS-REFERENCE TO RELATED APPLICATIONS

The present application claims priority from Japanese Patent Application No. 2018-095750 filed on May 17, 2018, the entire contents of which are hereby incorporated by reference.

BACKGROUND

The present disclosure relates to an intake device of an internal combustion engine.

In the related art, to control the gas flow inside a combustion chamber, there is known an intake device of an internal combustion engine provided with a partition that divides the interior of an intake pipe that couples with the combustion chamber into a first passage and a second passage, and a control valve capable of opening and closing the first passage. For instance, by activating the control valve in the direction of closing the first passage to strengthen tumble flow occurring inside the combustion chamber, the intake device described in Japanese Unexamined Patent Application Publication No. 2007-309275 regulates flow such that vapor passes through the second passage and is suctioned into the combustion chamber.

SUMMARY

An aspect of the disclosure provides an intake device of an internal combustion engine, including: a partition that divides an interior of an intake pipe that couples with a combustion chamber into a first passage and a second passage; a control valve capable of opening and closing the first passage; and a third passage that opens at or near a coupling site between the partition and the intake pipe on an inner face of the second passage. The third passage is configured to be capable of sucking in at least a part of a boundary layer produced at or near the coupling site by a vapor flowing through the second passage in a state in which the control valve is working in a direction of closing the first passage.

BRIEF DESCRIPTION OF THE DRAWINGS

The accompanying drawings are included to provide a further understanding of the disclosure and are incorporated in and constitute a part of this specification. The drawings illustrate example implementations and, together with the specification, serve to explain the principles of the disclosure.

DETAILED DESCRIPTION

Figure 1:
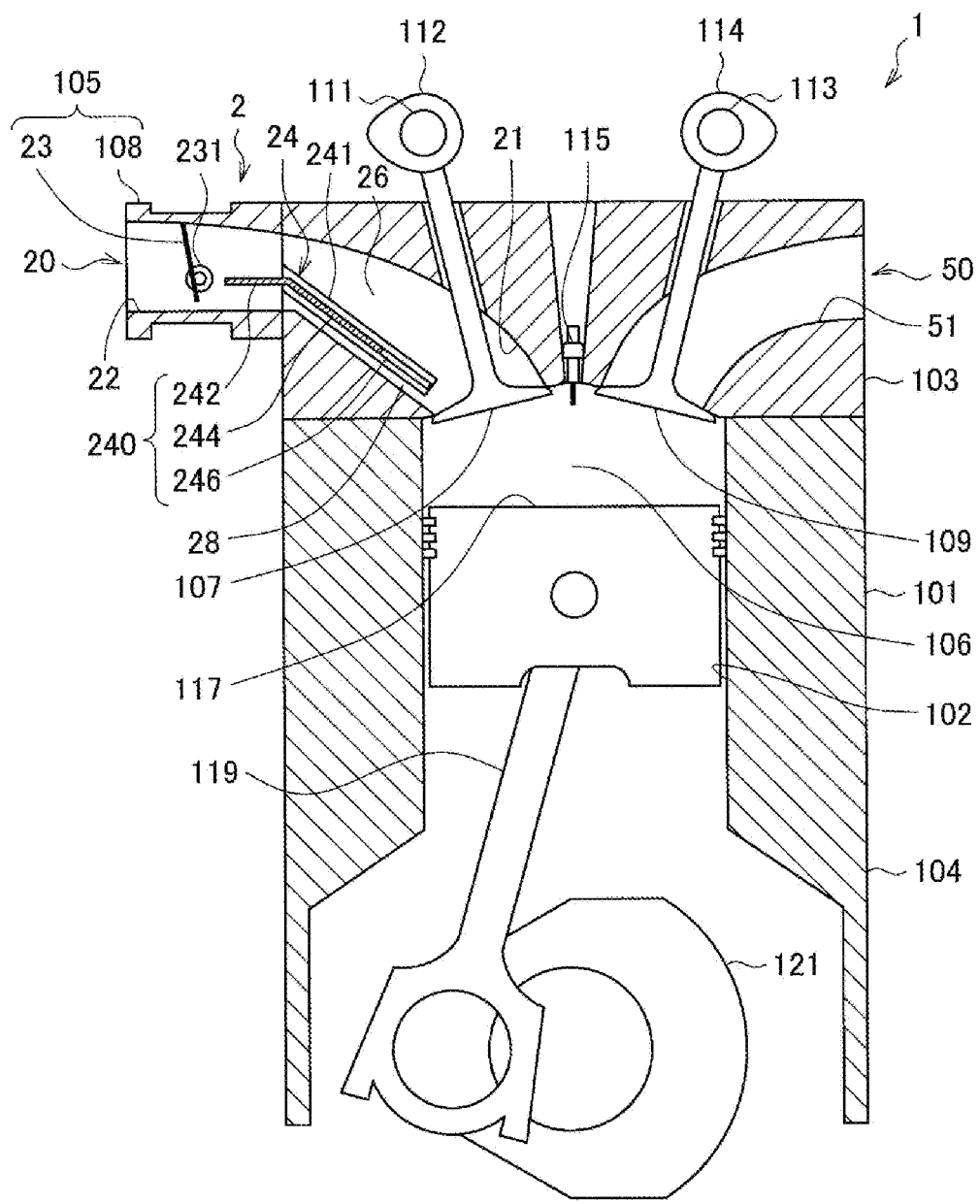
FIG. 1 is a cross-section diagram illustrating a schematic configuration of an engine according to a first embodiment of the disclosure.

Hereinafter, preferred embodiments of the disclosure will be described in detail with reference to the appended drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Because of the boundary layer that develops at or near the coupling site between the partition and the intake pipe on the inner face of the second passage, the flow rate distribution of vapor suctioned into the combustion chamber becomes unstable, and there is a risk of being unable to control the gas flow inside the combustion chamber as intended.

Accordingly, it is desirable to provide a novel and improved intake device of an internal combustion engine capable of improving the ability to control the gas flow inside the combustion chamber.

First Embodiment

First, FIGS. 1 and 2 will be referenced to describe a configuration of an intake device of an internal combustion engine (hereinafter, engine) according to a first embodiment.

[Configuration of Internal Combustion Engine]

FIG. 1 illustrates a cross-section of a single cylinder in an engine 1 of the first embodiment. The engine 1 is what is called a four-stroke spark-ignition gasoline engine which is mounted on-board an automobile and functions as a source of power for traction in the automobile. As illustrated in FIG. 1, the engine 1 includes a cylinder block 101, a cylinder head 103, a valve unit 105, an intake valve 107, an exhaust valve 109, an intake cam shaft 111, an exhaust cam shaft 113, a spark plug 115, a piston 117, a con rod 119, and a crank shaft 121.

In the cylinder block 101, an approximately cylindrical cylinder bore 102 is formed. The cylinder head 103 is disposed installed on the cylinder block 101. A crankcase 104 is provided as the same body of the cylinder block 101. A crank chamber is formed inside the crankcase 104. The crank chamber houses and allows free rotation of the crank shaft 121.

The cylinder bore 102 slidably houses the piston 117. The space demarcated by the cylinder head 103, the cylinder bore 102, and the piston 117 functions as a combustion chamber 106. The shape of the combustion chamber 106 on the cylinder head 103 side is what is called a pent roof. The small end of the con rod 119 is supported by the piston 117 through a pin. The large end of the con rod 119 is rotatably supported by the crank shaft 121. The piston 117 is joined to the crank shaft 121 through the con rod 119.

An intake port 21 and an exhaust port 51 are formed in the cylinder head 103. Both of the ports 21 and 51 are tubular, and each splits into two branches to couple with the combustion chamber 106 (see FIG. 2). In the cylinder head 103, two intake valves 107 and two exhaust valves 109 are installed. The intake cam shaft 111 extends substantially parallel to the crank shaft 121 in the direction in which the two intake valves 107 are lined up. The exhaust cam shaft 113 extends substantially parallel to the crank shaft 121 in the direction in which the two exhaust valves 109 are lined up.

One end of each intake valve 107 is positioned inside the combustion chamber 106, at or near the site where the intake port 21 opens to the combustion chamber 106. The other end of each intake valve 107 abuts an intake cam 112. The intake cam 112 is rotationally driven by the intake cam shaft 111. The rotation of the intake cam 112 causes the intake valve 107 to move reciprocally. With this arrangement, the intake valve 107 opens and closes the space between the intake port 21 and the combustion chamber 106. Similarly, an exhaust cam 114 is rotationally driven by the exhaust cam shaft 113, thereby causing the exhaust valve 109 to move reciprocally. With this arrangement, the exhaust valve 109 opens and closes the space between the exhaust port 51 and the combustion chamber 106.

The spark plug 115 is installed in the cylinder head 103. The tip of the spark plug 115 projects into the interior of the combustion chamber 106 at a position substantially overlapping the axis of the cylinder bore 102 and surrounded by the intake port 21 and the exhaust port 51.

In the intake stroke of the engine 1, by opening the intake valve 107 and also increasing the volume of the combustion chamber 106, a mixture of air and fuel flows into the combustion chamber 106 through the intake port 21. The intake port 21 functions as an intake pipe 20. In the compression stroke after the intake stroke, the air-fuel mixture in the combustion chamber 106 is compressed. When the spark plug 115 produces a spark at a predetermined timing, the air-fuel mixture is ignited and burns. With this arrangement, the volume of the combustion chamber 106 increases (combustion stroke). After that, by opening the exhaust valve 109 and also decreasing the volume of the combustion chamber 106, the spent air-fuel mixture flows out from the combustion chamber 106 through the exhaust port 51 (exhaust stroke). The exhaust port 51 functions as an exhaust pipe 50. In this way, the piston 117 performs a reciprocating motion by combustion. The reciprocating motion is converted into the rotary motion of the crank shaft 121 through the con rod 119.

[Configuration of Intake Device]

As illustrated in FIG. 1, the valve unit 105 is installed in an opening on the opposite side from the combustion chamber 106 in the intake port 21. The valve unit 105 includes a communicating member 108 and a tumble generation valve (TGV) 23. Inside the communicating member 108, a passage 22 is formed. The passage 22 is coupled to the intake port 21 and functions as the intake pipe 20. The TGV 23 is installed in the passage 22. The TGV 23 is what is called a butterfly valve, for instance, and adjusts the degree of opening in the passage 22 by having a planar member (valving element) rotate about a shaft 231. The shaft 231 is rotationally driven by an electric motor.

An intake manifold is attached to the valve unit 105. The passage inside the intake manifold is coupled to the passage 22 of the communicating member 108, and functions as the intake pipe 20. A throttle body is installed in the intake manifold, and the degree of opening in the passage of the intake manifold is adjusted by a throttle valve.

A partition 24 is installed in the intake pipe 20. The intake pipe 20 and the partition 24 function as an intake device 2 of the engine 1. FIG. 2 is a schematic diagram of the intake pipe 20, the combustion chamber 106, and the exhaust pipe 50 as viewed from the side of the cylinder block 101. Hereinafter, the terms upstream, midstream, and downstream refer to upstream, midstream, and downstream in the flow direction of the intake (mainstream) in the intake pipe 20.

The partition 24 includes a main body 240 and a joining part 241. The main body 240 is formed from a metal material for instance, and is shaped like a plate. The main body 240 includes an upstream part 242, a midstream part 244, and a downstream part 246. The upstream part 242 is tabular, and is bent with respect to the midstream part 244. The upstream part 242 extends inside the passage 22 of the valve unit 105, in the axial direction (lengthwise direction) of the passage 22, or in other words in the flow direction of the intake. The midstream part 244 and the downstream part 246 are tabular, and extend inside the intake port 21 in the axial direction (lengthwise direction) of the intake port 21, or in other words in the flow direction of the intake.

The cross-section of the intake pipe 20 cut in the radial direction (specifically at the location where the TGV 23 and the partition 24 are provided) is substantially rectangular. The main body 240 extends substantially parallel to the face on the side of the cylinder block 101 in the intake pipe 20. The main body 240 divides the intake pipe 20 into a first passage 26 and a second passage 28. In the interior of the intake pipe 20, the first passage 26 is located on the intake cam shaft 111 side, and the second passage 28 is located on the cylinder block 101 side. In FIG. 2, the partition 24 is viewed from the second passage 28 side. The main body 240 is located at a position biased toward the cylinder block 101 side from the axis of the intake pipe 20 in the radial direction of the intake pipe 20. The cross-sectional channel area (the cross section in the radial direction) of the first passage 26 is greater than the cross-sectional channel area of the second passage 28. The TGV 23 is located in the intake pipe 20 farther upstream than the partition 24 (main body 240), and is able to open and close the first passage 26. The TGV 23 functions as the intake device 2.

The joining part 241 of the partition 24 is formed from a resin material for instance, and is shaped like a semicircular column (rod-shaped/stick-shaped). The joining part 241 is permanently affixed to both sides of the midstream part 244 in the main body 240. As illustrated in FIG. 2, a semicylindrical depression 210 is formed in the inner walls of the intake port 21. The depression 210 extends in the axial direction of the intake port 21. One end on the intake upstream side in the axial direction of the depression 210 opens into the intake port 21 and also the outer wall face of the cylinder head 103. During the assembly of the partition 24, the joining part 241 is inserted into the depression 210 in the axial direction from the opening of the intake port 21, and fits into the depression 210. With this arrangement, the partition 24 is securely installed on the inner wall of the intake port 21. The face on the main body 240 side in the joining part 241 (the face on the opposite side in the radial direction from the outer circumferential face of the semicylindrical shape) is continuous with the inner face of the intake port 21, and functions as part of the inner wall of the intake port 21.

Figure 2:
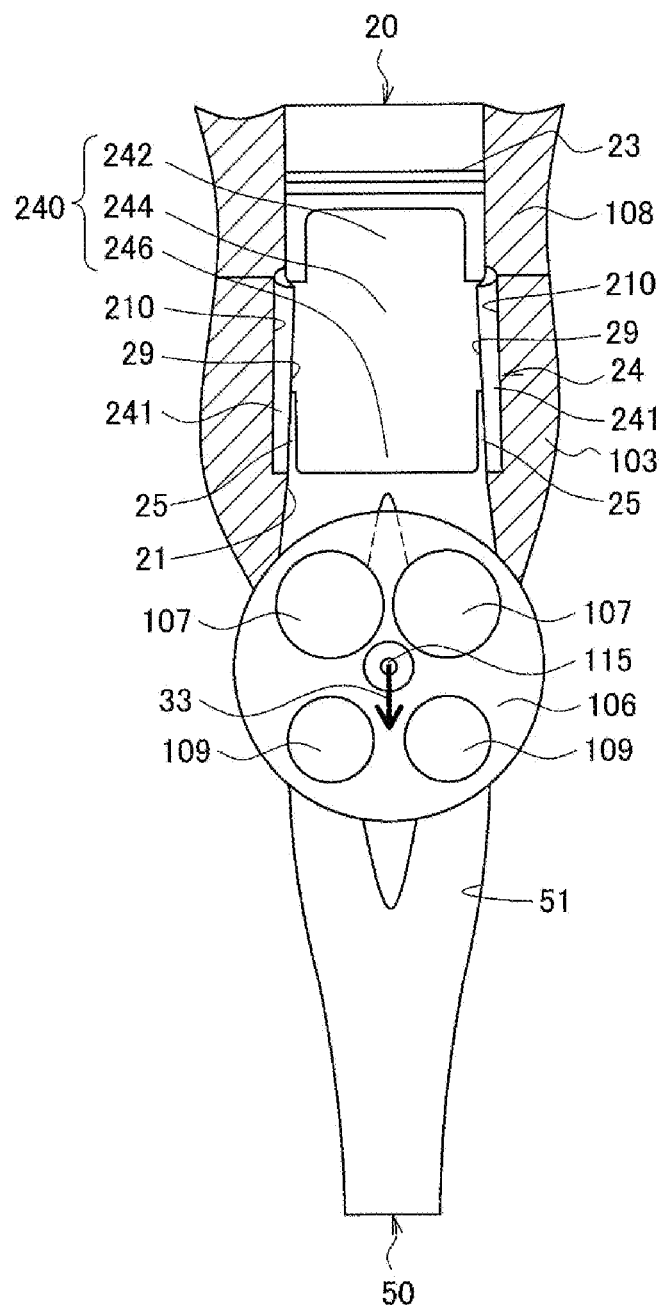
FIG. 2 is a diagram of the engine as viewed from the side of the cylinder block according to the first embodiment.

As illustrated in FIG. 2, the width of the upstream part 242 (the dimension in the direction at a right angle to the axial direction of the intake pipe 20) is smaller than the width of the midstream part 244. A gap exists between both ends in the width direction (the direction at a right angle to the axial direction of the intake pipe 20) of the upstream part 242 and the inner wall of the intake pipe 20 (communicating member 108). The inner diameter of the intake port 21 gradually increases proceeding from upstream to downstream. The width of the midstream part 244 gradually increases proceeding from the upstream side to the downstream side of the intake pipe 20, following the change in the inner diameter of the intake port 21.

A gap 25 exists between both ends in the width direction (the direction at a right angle to the axial direction of the intake pipe 20) of the downstream part 246 and the face of the joining part 241 (continuous with the inner face of the intake port 21). The gap 25 opens to the coupling site 29 between the partition 24 (main body 240) and (the joining part 241 that forms) the inner wall of the intake port 21 on the inner face of the second passage 28, and couple the first passage 26 and the second passage 28. The width of the opening in the gap 25 (hereinafter simply called the "width of the gap 25") in the direction at a right angle to the axial direction of the intake pipe 20 (the direction along the surface of the main body 240) may be less than 6.6 mm. For instance, the width of the gap 25 may be 2.1 mm or less (but greater than zero) on average (in the axial direction of the intake pipe 20). The gap 25 extends continuously in the axial direction of the intake pipe 20, and opens to the downstream end of the partition 24 (downstream part 246). The gap 25 is located in the range of the downstream part 246 in the axial direction of the intake pipe 20.

[Effects of Intake Device]

Figure 3:
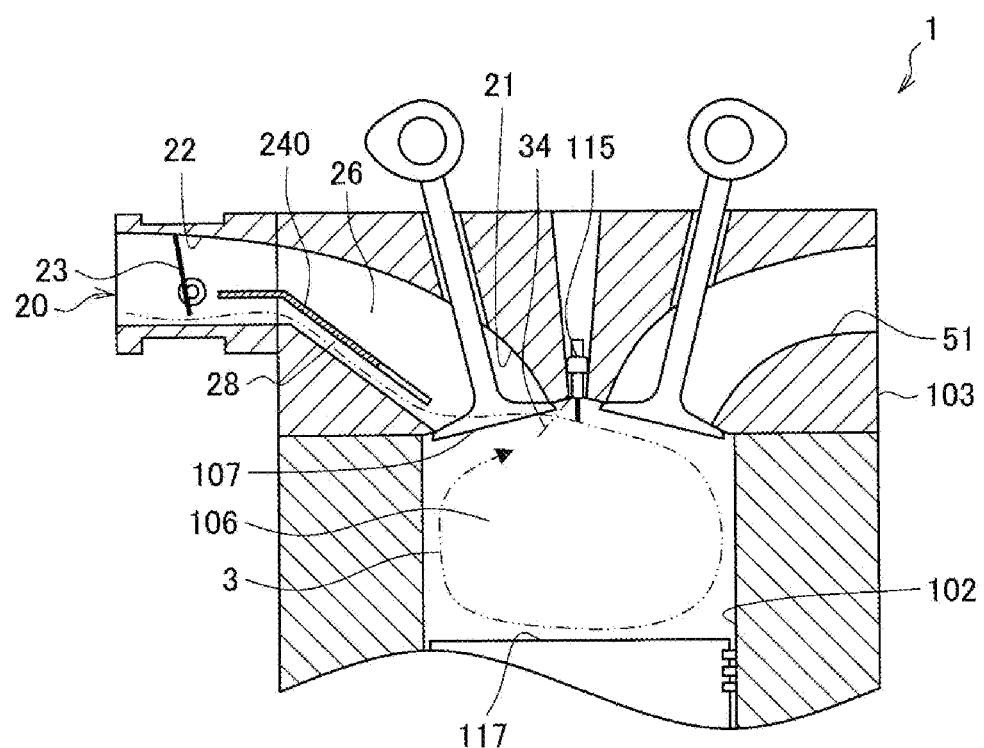
FIG. 3 is a cross-section diagram illustrating the intake stroke of the engine according to the first embodiment.

Next, FIGS. 3 to 14 will be referenced to describe the effects of the intake device 2 according to the first embodiment. FIG. 3 is an enlarged view of a portion of FIG. 1, in which the joining part 241 is omitted from illustration. In FIG. 3, the flow of intake (mainstream) in the intake stroke is illustrated by the chain-line arrow 3. As illustrated in FIG. 3, in the intake stroke, vapor passes through the intake pipe 20 and is suctioned into the combustion chamber 106. The intake flowing into the combustion chamber 106 proceeds along to the cylinder bore 102 to the top face of the piston 117, and then flows along the top face to the cylinder head 103 side. With this arrangement, the vapor forms a longitudinal vortex flow (tumble flow) inside the combustion chamber 106. For instance, when the load on the engine 1 is low and the intake amount is small, restricting the cross-sectional channel area of the first passage 26 with the TGV 23 causes the vapor to pass through on the second passage 28 side. When the degree of opening of the TGV 23 reaches a minimum and the first passage 26 is closed off by the valving element of the TGV 23, almost all of the vapor guided into the intake pipe 20 passes through the second passage 28 and proceeds to the combustion chamber 106.

In this way, by narrowing the channel through which vapor passes and decreasing the cross-sectional channel area of the intake pipe 20, the flow rate of the vapor is raised. The inflow of such vapor (air-fuel mixture) with a higher flow rate into the combustion chamber 106 strengthens the tumble flow. If the piston 117 is stroked up to near top dead center in the compression stroke, the tumble flow collapses, a multitude of small turbulent eddies are generated, and the flow rate fluctuation (the turbulent intensity of gas flow) of the intake inside the combustion chamber 106 immediately before ignition increases. If the air-fuel mixture is ignited by the spark plug 115 in this state, fast burn of the fuel is achieved even during lean-burn or diluted-burn conditions, making it possible to improve fuel efficiency and combustion stability. In this way, by opening and closing the first passage 26, the TGV 23 functions as a control valve for strengthening tumble flow. Note that the top face of the piston 117 may also be shaped to strengthen gas flow, stratified charge combustion, and the like.

Figure 4:
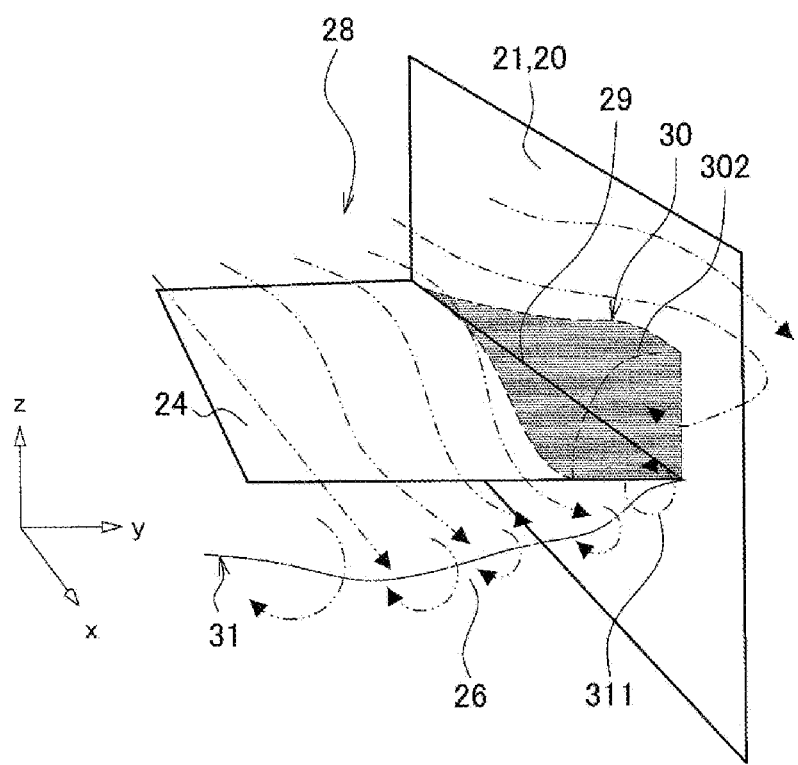
FIG. 4 is a schematic diagram illustrating the flow of vapor in a comparative example.
Figure 5:
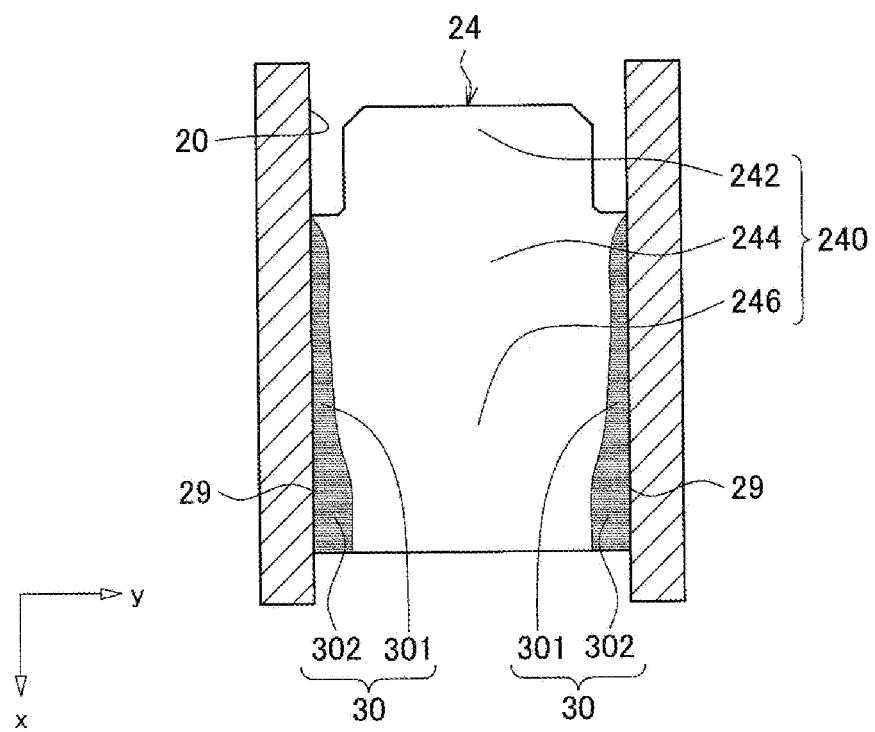
FIG. 5 is a plan view illustrating a partition together with a vapor boundary layer according to the comparative example.

Hereinafter, FIGS. 4 to 7 will be referenced to describe challenges using a comparative example. The comparative example is an intake device in which the gap 25 or other passage is not open at or near the coupling site 29 between the partition 24 (downstream part 246) and the intake pipe 20 on the inner face of the second passage 28. In the following, the x-axis is provided in the axial direction of the intake pipe 20 (intake port 21), the y-axis is provided in a direction at a right angle to the axial direction of the intake pipe 20 and in a direction parallel to the face of the partition 24 (the midstream part 244 and the downstream part 246), and the z-axis is provided in the direction orthogonal to the face of the partition 24 (the midstream part 244 and the downstream part 246). FIG. 4 is a schematic diagram of the vicinity of the coupling site 29 near the downstream end of the partition 24 (downstream part 246) in the comparative example, in which the flow of vapor is illustrated with arrows. FIG. 5 is a plan view of the partition 24 installed in the intake pipe 20 (intake port 21) as viewed from the second passage 28 side in the comparative example. In FIG. 5, the joining part 241 is omitted from illustration.

As illustrated in FIG. 4, vapor passes through the second passage 28 in the state in which the TGV 23 is working in the direction of closing the first passage 26. At or near the coupling site 29 between the partition 24 and the intake pipe 20 on the inner face of the second passage 28 (the region enclosed by the surface of the partition 24 and the inner wall face of the intake pipe 20), a boundary layer 30 of vapor develops three-dimensionally proceeding from upstream to downstream. As illustrated in FIG. 5, the boundary layer 30 starts developing from the upstream end of the midstream part 244 of the partition 24 (the terminus of the gap between the midstream part 244 and the upstream part 242), and develops as a laminar or turbulent boundary layer 301 proceeding from the upstream side to the downstream side. After that, as illustrated in FIG. 4, at the downstream end of the partition 24, a wake 31 is produced. The wake 31 produces a backflow (engulfment) 311, thereby aiding the development of the boundary layer 30 (turbulent boundary layer 302) on the downstream side.

Figure 6:
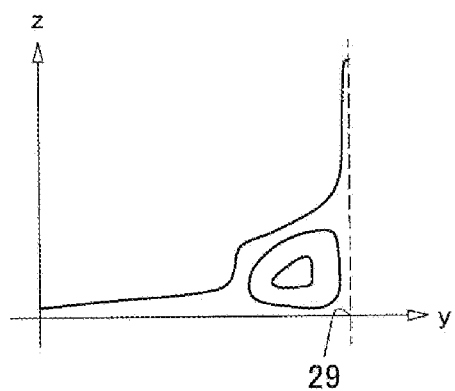
FIG. 6 illustrates a flow rate distribution (in the y-z plane) of vapor in the comparative example.
Figure 7:
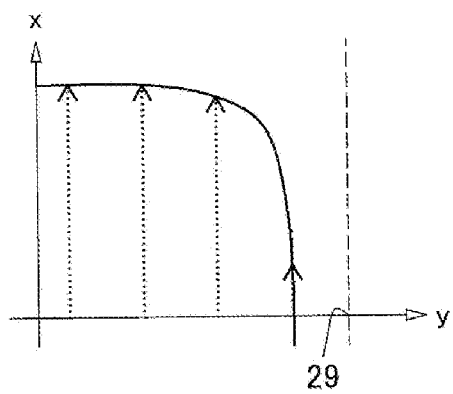
FIG. 7 illustrates a flow rate distribution (in the x-y plane) of vapor in the comparative example.

FIGS. 6 and 7 illustrate the flow rate distribution of vapor near the downstream end of the partition 24 in the second passage 28 in the comparative example obtained by experiment. FIG. 7 illustrates the flow rate distribution near the surface of the partition 24. As illustrated in FIGS. 6 and 7, a bias occurs in the distribution of the flow rate at the downstream end of the partition 24. Near the coupling site 29 (the region enclosed by the surface of the partition 24 and the inner wall face of the intake pipe 20), the flow rate goes negative (flows backward with respect to the mainstream). Since the effective cross-sectional channel area of the second passage 28 is decreased by the boundary layer 30 and the wake 31 (backflow 311), the (average) flow rate of the mainstream increases. The backflow and the bias in the flow rate distribution occurring at the downstream end of the partition 24 synergistically affect the generation of the separated flow of the wake 31 and make the flow extremely unstable. With this arrangement, since the flow rate distribution of the vapor suctioned into the interior of the combustion chamber 106 becomes unstable, in the combustion chamber 106 immediately before ignition (near the top dead center of the piston 117), the intended pattern (turbulent intensity) of gas flow cannot be generated.

For instance, the y-axis direction at a right angle to the axial direction of the intake pipe 20 and parallel to the surface of the partition 24 is the radial direction of the opening of the intake port 21 in the combustion chamber 106 and also the radial direction of the cylinder bore 102. Therefore, the bias of the flow rate distribution in the y-axis direction may produce a flow component (transverse vortex) in the transverse direction (radial direction) of the intake in the combustion chamber 106. This causes the tumble flow to weaken, and there is a risk of being unable to achieve the expected strengthening of the tumble flow. If the tumble flow is not successfully strengthened, the burning rate falls, and combustion stability cannot be improved. Note that, as illustrated in FIG. 2, the intake port 21 splits into two branches on the side closer to the combustion chamber 106 than the partition 24 and is coupled with the combustion chamber 106. In this way, in the case in which there are multiple intake ports 21, due to the above bias in the flow rate distribution at the downstream end of the partition 24, there is a risk that the flow of intake from each intake port 21 into the interior of the combustion chamber 106 will become more unstable.

In contrast, in the intake device according to the first embodiment, the gap 25 opens at or near the coupling site 29 between the partition 24 and the intake pipe 20 on the inner face of the second passage 28. The boundary layer 30 (turbulent boundary layer 302) is sucked into the gap 25 and sucked out to the first passage 26. With this arrangement, since the above development (increase in thickness) of the boundary layer 30 is moderated, bias is less likely to occur in the distribution of the flow rate at the downstream end of the partition 24. Therefore, since the flow rate distribution of the vapor suctioned into the interior of the combustion chamber 106 is stabilized, the ability to control the gas flow in the interior of the combustion chamber 106 may be improved. Specifically, it becomes possible to strengthen the tumble flow as intended.

The gap 25 is not limited to being at the coupling site 29 between the inner face of the intake pipe 20 and the partition 24, and may also be near the coupling site 29 on the partition 24. The point is that it is sufficient to open up the range where the boundary layer 30 (turbulent boundary layer 302) could develop. Note that inside joining part 241 that forms the inner wall of the intake port 21 or the cylinder block 101, a third passage capable of sucking in at least part of the boundary layer 30 of the second passage 28 may also be formed. If a suitable low-pressure space (a space at a lower pressure than the second passage 28 and also allowing the inflow of vapor) is coupled to the third passage, discharging the vapor sucked in from the boundary layer 30 to the low-pressure space causes the boundary layer 30 to be sucked out more readily. In the first embodiment, the gap 25 coupling the first passage 26 and the second passage 28 functions as the third passage. Therefore, since it is not necessary to form a third passage in the cylinder block 101 or the like, and also since the first passage 26 can be used as a low-pressure space, the configuration of the third passage may be simplified.

Figure 8:
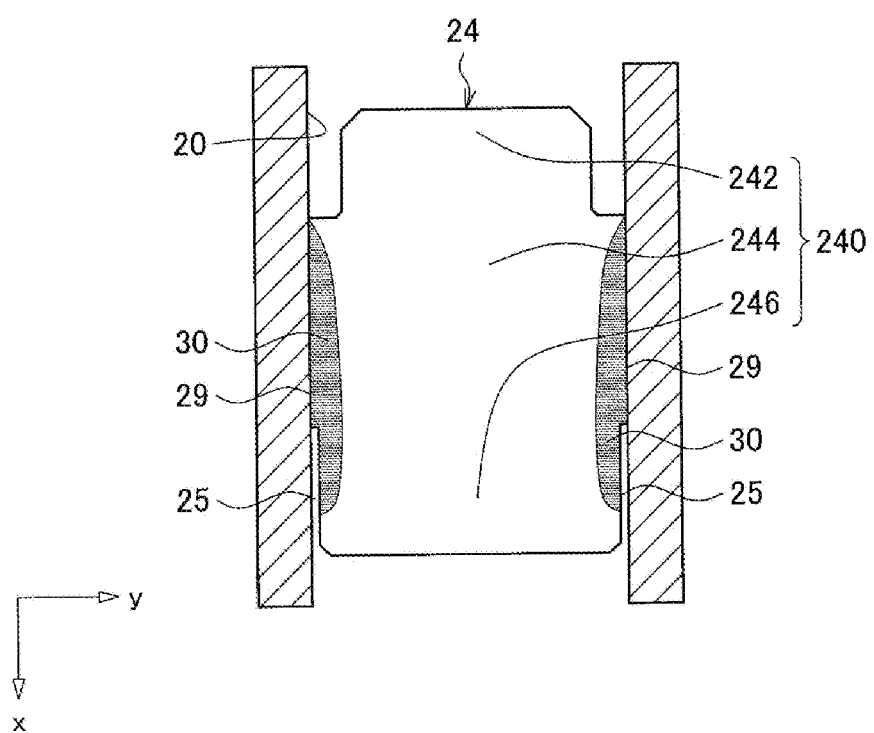
FIG. 8 is a plan view illustrating a partition together with a vapor boundary layer according to the first embodiment.
Figure 9:
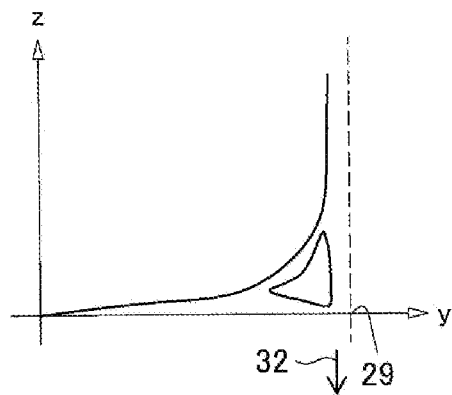
FIG. 9 illustrates a flow rate distribution (in the y-z plane) of vapor in the first embodiment (gap width 0.7 mm)
Figure 10:
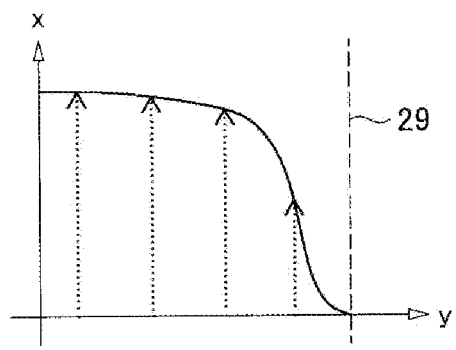
FIG. 10 illustrates a flow rate distribution (in the x-y plane) of vapor in the first embodiment (gap width 0.7 mm)
Figure 11:
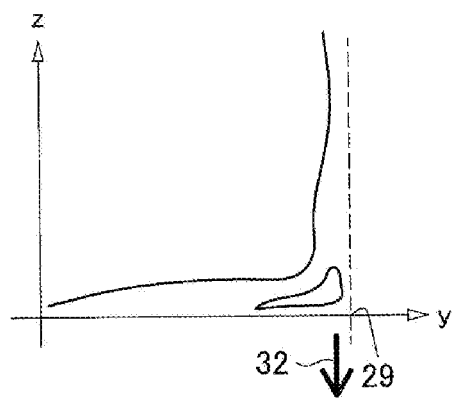
FIG. 11 illustrates a flow rate distribution (in the y-z plane) of vapor in the first embodiment (gap width 1.4 mm)
Figure 12:
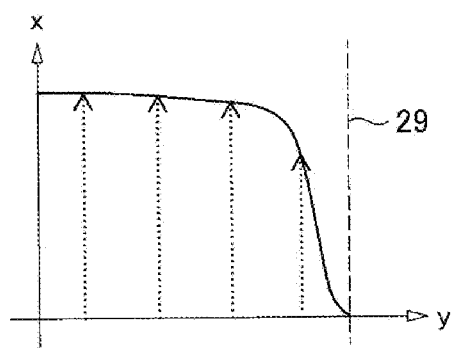
FIG. 12 illustrates a flow rate distribution (in the x-y plane) of vapor in the first embodiment (gap width 1.4 mm)

FIG. 8 is a plan view, similar to FIG. 5, of the partition 24 of the first embodiment. FIGS. 9 to 12 are diagrams similar to FIGS. 6 and 7, illustrating the distribution of the flow rate of vapor near the downstream end of the partition 24 in the first embodiment obtained by experiment. FIGS. 9 and 10 illustrate the flow rate distribution in the case in which the (average) width of the gap 25 is 0.7 mm. FIGS. 11 and 12 illustrate the flow rate distribution in the case in which the (average) width of the gap 25 is 1.4 mm. As illustrated by the arrow 32 in FIG. 9, the boundary layer 30 is sucked out from the gap 25. With this arrangement, as illustrated in FIG. 8, the boundary layer 30 is sucked out before developing as the turbulent-flow boundary layer 302, and development is largely moderated. Particularly, the growth of the turbulent boundary layer 302 is moderated and the boundary layer 30 is eliminated at the downstream end of the partition 24. In other words, the size (thickness) of the boundary layer 30 is restricted.

Therefore, as illustrated in FIGS. 9 and 10, the bias in the flow rate distribution at the downstream end of the partition 24 is moderated. The drop in the flow rate near the coupling site 29 is moderated, and negative flow rate (backflow) is also moderated. Since the eliminated region (the decrease in the effective cross-sectional channel area) of the second passage 28 by the boundary layer 30 becomes smaller, the (maximum) flow rate of the mainstream is lower than the comparative example, but the reduction is small. The flow rate distribution stabilizes as a whole. If the width of the gap 25 is increased past 0.7 mm, as illustrated by the arrow 32 in FIG. 11, the amount of the boundary layer 30 sucked out from the gap 25 increases. Since the component of the flow in the z-axis direction increases near the coupling site 29 (gap 25), as illustrated in FIGS. 11 and 12, the flow rate in the x-axis direction falls. Also, since the elimination region of the second passage 28 becomes even smaller (the effective cross-sectional channel area increases further), the flow rate of the mainstream also falls gently.

In the first embodiment, the width of the gap 25 is less than 6.6 mm. This is a width that produces a turbulent intensity greater than the turbulent intensity produced in the case of no gap 25 (in the above comparative example), taking the turbulent intensity to be the flow rate fluctuation of intake in the interior of the combustion chamber 106 immediately before ignition in the state in which the TGV 23 is working in the direction of closing the first passage 26. Hereinafter, a specific description will be given.

Figure 13:
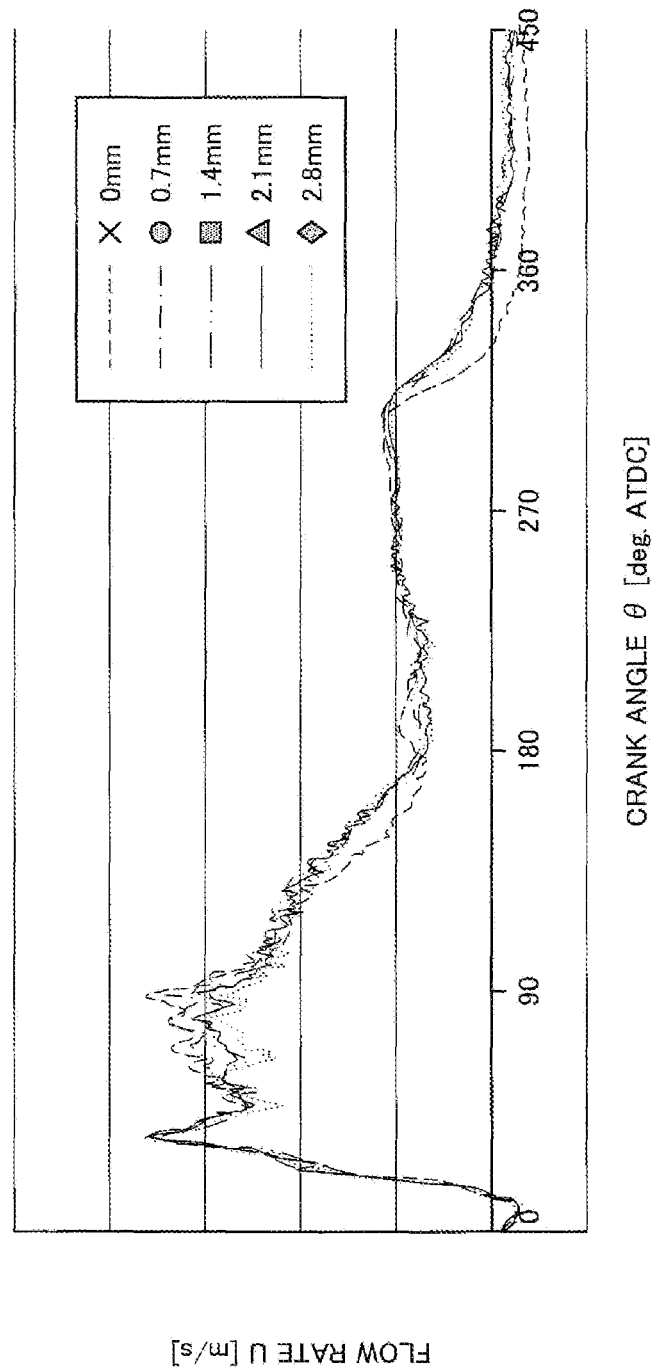
FIG. 13 is a graph illustrating the relationship between the crank angle and the speed of gas flow inside the combustion chamber.

FIG. 13 is a graph illustrating the relationship between the rotational angle of the crank shaft (crank angle) θ and the flow rate U of intake measured at the position of the spark plug 115. FIG. 13 illustrates the above relationship based on the results of experimentation in which the engine speed is set to 1200 rpm, the throttle valve is opened fully, the degree of opening of the TGV 23 is set to a minimum, and the width of the gap 25 is varied from 0 mm to 2.8 mm in increments of 0.7 mm. The flow rate U of intake is the speed illustrated by the arrow 33 in FIG. 2, and is the flow rate of the tumble flow measured by a laser Doppler flow meter at the position 34 in FIG. 3. The divergence (flow rate fluctuation) from the average of the flow rate U (for a given crank angle θ) expresses the magnitude of energy (turbulent intensity) carried by the turbulent flow. For instance, by taking the square root of the average of squares of the measured fluctuation of the flow rate U, the turbulent intensity u is computed in units of velocity.

As illustrated in FIG. 13, the flow rate U increases in the intake stroke, and over the compression stroke the flow rate falls to near zero for θ=360±30 degrees (near top dead center). In other words, the tumble flow collapses near top dead center, and a multitude of small turbulent eddies are generated. By performing ignition in this state, an improvement in the burning rate and the like may be achieved. In the case in which the width of the gap 25 is 0 mm, the flow rate U goes negative near top dead center. This indicates that the intended pattern of gas flow is not being generated inside the combustion chamber 106, and the quality of the tumble flow has fallen. In other words, in all cases in which the width of the gap 25 is greater than 0 mm (0.7 mm, 1.4 mm, 2.1 mm, 2.8 mm), the flow rate U approaches zero near top dead center, and a drop in the quality of the tumble flow is suppressed.

Figure 14:
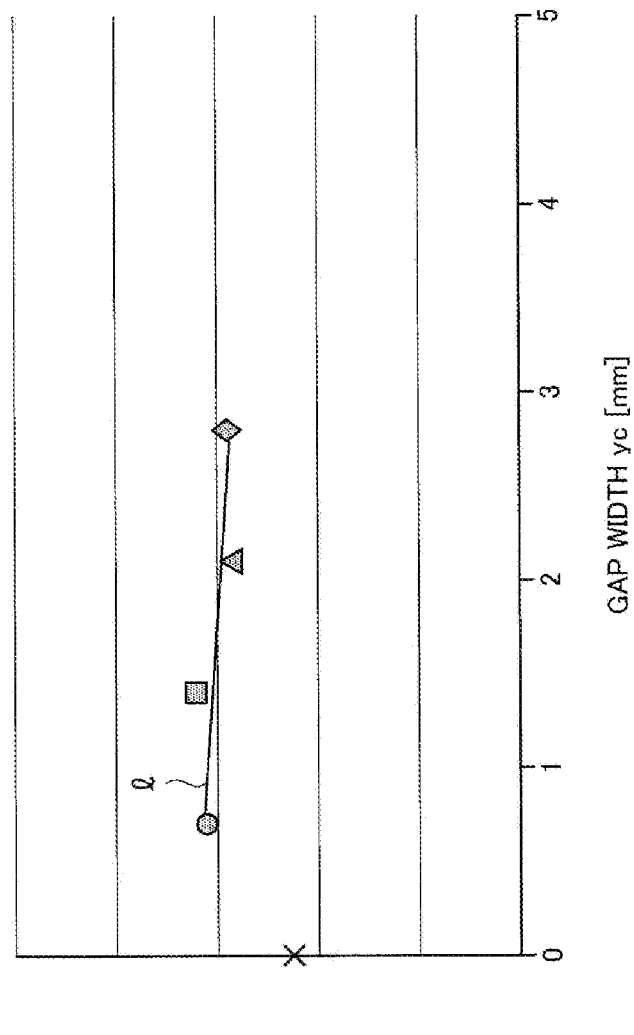
FIG. 14 is a graph illustrating the relationship between the gap width and the turbulent intensity of gas flow inside the combustion chamber.

FIG. 14 is a graph plotting the turbulent intensity u' near top dead center with respect to the width yc of the gap 25. In each of the cases in which the width yc of the gap 25 is greater than 0 mm (0.7 mm, 1.4 mm, 2.1 mm, 2.8 mm), the above turbulent intensity u' is greater than in the case in which the width yc is 0 mm. In other words, small turbulent eddies due to the collapse of the tumble flow are generated as intended.

As the width yc of the gap 25 becomes greater, the turbulent intensity u' tends to become smaller. This tendency is approximated by the line 1 illustrated in FIG. 14. Computing the width yc at which the turbulent intensity u' becomes the same as the turbulent intensity u' (=1.23) when the width yc is 0 mm on the basis of the above line 1 (u'=−0.0143×yc+1.325) gives 6.64 mm. One reason why the turbulent intensity u' becomes smaller as the width yc of the gap 25 becomes larger is that if the width yc is set too large, the flow rate U of the mainstream also falls. The mainstream flow rate U serves as an indicator of the energy that generates the small turbulent eddies (turbulent intensity u'). Therefore, in the first embodiment, the width yc is limited to a range smaller than 6.6 mm, such that the turbulent intensity u' does not become too small due to a drop in the mainstream flow rate U. With this arrangement, a larger turbulent intensity u' than when the width yc is 0 mm is obtained.

In addition, the turbulent intensity u' serves as an indicator of fuel consumption. Therefore, the width yc of the gap 25 may also be set to reach a range of turbulent intensity whereby the fuel consumption can be improved to a predetermined value or greater. For instance, if the width yc is 2.1 mm or less (but greater than zero), as the above line 1 clearly demonstrates, the turbulent intensity u' becomes a predetermined value or greater, and therefore the fuel consumption can be improved by a predetermined amount or greater. In this case, within the range where the width yc is less than 1 mm, the width yc at which the turbulent intensity u' becomes the same value as the turbulent intensity u' when the width yc is 2.1 mm may be confirmed actually, and this value may be set as a predetermined value for the lower bound of yc. Note that to detect the relationship between the width yc and the turbulent intensity u', the flow rate U (turbulent intensity u') may be measured at any position in the combustion chamber 106 not limited to the position 34 in FIG. 3, and may also be measured by a flow meter other than a laser Doppler flow meter.

The opening of the gap 25 is on the downstream side of the partition 24. Therefore, since it becomes possible to suck out the turbulent boundary layer 302 in a region where the boundary layer 302 is likely to develop, the above effects can be obtained efficiently.

Typically, for an entrance length L0 of a turbulent boundary layer inside a round pipe with an inner diameter d, the relationship L0=(25 to 40)d is known to hold. Therefore, if the second passage 28 can be approximated as a round pipe, the opening of the gap 25 may be provided within L0 (treating d as 40 times the distance for instance) from the downstream end of the partition 24 in the axial direction of the intake pipe 20. The average value of the diameter of the second passage 28 may be used as the inner diameter d. The average value of the width of the partition 24 (in other words, the average obtained by averaging the diameter of the second passage 28 on the surface of the partition 24 in the axial direction of the intake pipe 20) may also be treated as d. With this arrangement, the size (thickness) of the turbulent boundary layer 302 at the downstream end of the partition 24 may be moderated, and a bias in the flow rate distribution may be improved potentially.

More specifically, the entrance length L1 is taken to be the distance in the axial direction of the intake pipe 20 along which the turbulent boundary layer 302 develops (that is, fully develops) until the distribution in the radial direction of the flow rate of the vapor in the second passage 28 near the coupling site 29 (where the gap 25 does not open for part of the flow) becomes constant. L1 is detectable by experiment or the like. In the axial direction of the intake pipe 20, if the opening of the gap 25 is within a distance of L1 from the downstream end of the partition 24, the full development of the turbulent boundary layer 302 at the downstream end of the partition 24 can be avoided, thereby making it possible to improve the bias in the flow rate distribution at the downstream end of the partition 24 more reliably.

Note that the shape of the gap 25 is not limited to being rectangular (oblong) like the first embodiment, and may also be wedge-shaped (triangular) or the like. Also, the edges of the members (such as the downstream part 246) that form the gap 25 are not limited to being linear, and may also be curved.

In the first embodiment, the gap 25 is continuous in the axial direction of the intake pipe 20, but may also be discontinuous in the axial direction of the intake pipe 20. For instance, in the case in which the intake pipe 20 (partition 24) is long in the axial direction, the gap 25 may be provided partway along the range occupied by the partition 24 in the axial direction. In other words, the gap 25 does not have to be open at the downstream end of the partition 24. Also, the gap 25 is not limited to the downstream side of the partition 24, and may be also located on the midstream side or the upstream side. In these cases, the gap 25 may also be provided to open at positions and intervals in the axial direction of the intake pipe 20 such that the thickness of the boundary layer 30 at the downstream end of the partition 24 falls within a predetermined range (a range in which a turbulent intensity greater than the above comparative example is obtained).

Additionally, the gap 25 may be also located on only one side in the width direction of the partition 24. In the first embodiment, the partition 24 is located (at or near the coupling site 29) on both sides of the partition 24. Therefore, the bias in the flow rate distribution near the downstream end of the partition 24 can be moderated effectively.

The shape of the radial cross-section of the intake pipe 20 is not limited to being square, and may also be circular, elliptical, or the like. Also, the shape of the partition 24 (main body 240) does not have to be tabular. For instance, in the case in which the inner wall of the intake pipe 20 is curved, the partition 24 (main body 240) may also be curved to follow the inner wall of the intake pipe 20.

Note that at the coupling site 29 between the partition 24 and the intake pipe 20 on the inner face of the second passage 28, if the angle between the partition 24 and the inner wall of the intake pipe 20 is within a predetermined range (for instance, greater than 0 degrees but not more than 135 degrees), the above effects of sucking out the boundary layer 30 due to the gap 25 and thereby stabilizing the flow rate distribution can be obtained more effectively. In other words, at the coupling site 29, if the above angle is large (for instance, if the face of the partition 24 and the inner face of the intake pipe 20 are coupled gently), the boundary layer 30 is less likely to develop three-dimensionally. If the above angle is small to a certain degree (while remaining within the above predetermined range), the boundary layer 30 is more likely to develop three-dimensionally at the coupling site 29 and produce a bias in the distribution of the flow rate at the downstream end of the partition 24. By providing the gap 25 in such a case, the bias in the flow distribution can be moderated effectively.

Note that the material of the main body 240 of the partition 24 is not limited to metal, and may also be resin or the like. In addition, the joining part 241 may also be omitted. In other words, the coupling site 29 may also be a coupling site between the main body 240 (as the partition 24) and the inner wall of the intake pipe 20 (not configured by the joining part 241). Any method may be used to attach the partition 24 to the inner wall of the intake pipe 20, and the partition 24 is affixable to the intake pipe 20 by rivets, welding, or the like. Also, the partition 24 may be formed in the intake pipe 20 (intake port 21) by pouring in a separate metal plate when casting the cylinder head 103. The partition 24 is intended to be located in the intake pipe 20, and is not limited to the intake port 21 and may also be installed at the intake manifold or the like. Furthermore, the partition 24 does not have to be separate from the intake pipe 20. The gap 25 may also be provided in a partition 24 that is of one body with the intake pipe 20. The first passage 26 opened and closed by the TGV 23 may also be on the cylinder block 101 side (the lower side in FIG. 1) rather than the intake cam shaft 111 side (the upper side in FIG. 1) with respect to the second passage 28.

Second Embodiment

Figure 15:
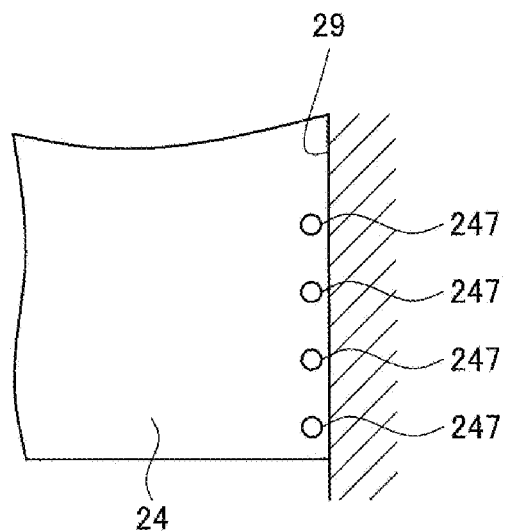
FIG. 15 is a schematic diagram illustrating one part of a partition according to a second embodiment.

Next, FIG. 15 will be referenced to describe an intake device of an internal combustion engine according to the second embodiment. The second embodiment is a modification of the third passage (gap 25) in the first embodiment. FIG. 15 is a schematic diagram of the vicinity of the coupling site 29 near the downstream end of the partition 24 in the second embodiment. Near the coupling site 29 on the partition 24, holes 247 that penetrate the partition 24 are provided. There are multiples holes 247, which are lined up in the axial direction of the intake pipe 20. The diameter of each of the holes 247 may be greater than zero and less than 6.6 mm. For instance, the diameter may be 2.1 mm or less. At least a part of each of the holes 247 is preferably within a range of 6.4 mm from the coupling site 29 in the direction at a right angle to the axial direction of the intake pipe 20.

In the second embodiment, the holes 247 function as the third passage capable of sucking in at least part of the boundary layer 30 in the second passage 28. The diameter of the holes 247 preferably is limited to a range less than 6.6 mm. With this arrangement, similarly to the first embodiment, a greater turbulent intensity than when the diameter of the holes 247 is 0 mm is obtained. Also, if the diameter of the holes 247 is 2.1 mm or less (but greater than zero), similarly to the first embodiment, fuel consumption can be improved by a determined amount or greater.

At least a part of each of the holes 247 is preferably within a range of 6.4 mm from the coupling site 29 in the direction at a right angle to the axial direction of the intake pipe 20. The applicant has confirmed that the maximum width of the boundary layer 30 (turbulent boundary layer 302) produced near the coupling site 29 in the above comparative example is 6.4 mm. Therefore, by disposing at least some of the holes 247 within the above range, the holes 247 are able to function as the third passage more reliably. When each of the holes 247 is closer to the coupling site 29 rather than farther away from the coupling site 29, the range positioned within the range of the boundary layer 30 (the open area of the third passage) widens. From this perspective, each of the holes 247 preferably is closer to the coupling site 29. Note that the shape of (the openings of) the holes 247 is not limited to being circular, and may also be elliptical, or may be triangular or another polygonal shape.

There are multiples holes 247, which are lined up in the axial direction of the intake pipe 20. Therefore, by adjusting the position and spacing of the holes 247, it is possible to moderate the open area of the third passage as a whole while also keeping the thickness of the boundary layer 30 at the downstream end of the partition 24 within a predetermined range (the range in which a turbulent intensity greater than the above comparative example is obtained). For instance, in the case in which the intake pipe 20 (partition 24) is long in the axial direction, the holes 247 may be disposed at every position in front of where the turbulent boundary layer 302 develops fully. Also, similarly to the first embodiment, at least one hole 247 may be disposed within the entrance length L0 or L1 from the downstream end of the partition 24 in the axial direction of the intake pipe 20.

Since the rest of the configuration and other effects are the same as the first embodiment, a description is omitted.

Third Embodiment

Figure 16:
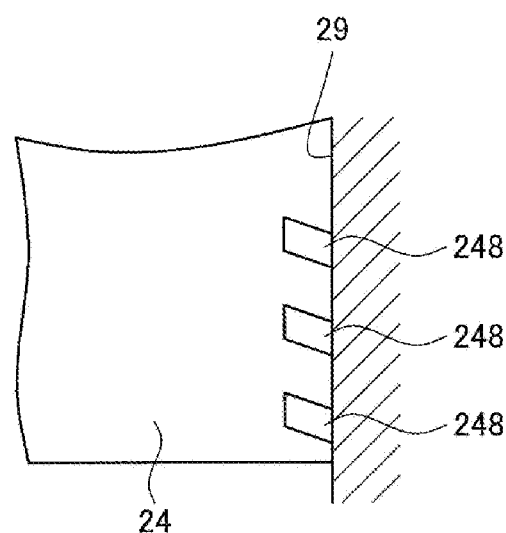
FIG. 16 is a schematic diagram illustrating one part of a partition according to a third embodiment.

Next, FIG. 16 will be referenced to describe an intake device of an internal combustion engine according to the third embodiment. The third embodiment is a modification of the third passage (gap 25) in the first embodiment. FIG. 16 is a schematic diagram of the vicinity of the coupling site 29 near the downstream end of the partition 24 in the third embodiment. There are slits 248 in the partition 24. There are multiples slits 248, which are lined up in the axial direction of the intake pipe 20. Each of the slits 248 extends up to the coupling site 29 (is continuous with the coupling site 29) in the partition 24 (main body 240). The width of each of the slits 248 preferably is greater than zero but not more than 2.1 mm. The lengthwise dimension of each of the slits 248 preferably is greater than 2.1 mm but not more than 10 mm.

In the third embodiment, the slits 248 function as the third passage capable of sucking in at least part of the boundary layer 30 in the second passage 28. The lengthwise dimension of each of the slits 248 preferably is greater than 2.1 mm but not more than 10 mm. If the dimensions of the slits 248 are smaller than 6.6 mm in the direction along the face of the partition 24 (main body 240) and also at a right angle to the axial direction of the intake pipe 20 (hereinafter called the width direction of the intake pipe 20), similarly to the first embodiment, a greater turbulent intensity than when there are no slits 248 is obtained. In the third embodiment, since each of the slits 248 has a sloping shape with respect to the width direction of the intake pipe 20, the dimension of each of the slits 248 in the width direction of the intake pipe 20 can be made smaller than the dimension in the lengthwise direction of the slits 248.

Note that in the third embodiment, the shape of each of the slits 248 is a shape that slopes (with respect to the width direction of the intake pipe 20) from the upstream side to the downstream side proceeding toward the coupling site 29 (the inner wall of the intake pipe 20), but the shape is not limited thereto, and may also be a shape that extends in the width direction of the intake pipe 20 or a shape that slopes from the downstream side to the upstream side proceeding toward the coupling site 29. Also, each of the slits 248 is not limited to being linear, and may also be curved.

Each of the slits 248 extends up to the coupling site 29 in the partition 24. Therefore, by having the slits 248 open to the boundary layer 30 near the coupling site 29, the slits 248 are able to function as the third passage more reliably.

There are multiples slits 248, which are lined up in the axial direction of the intake pipe 20. Therefore, by adjusting the position and spacing of the slits 248, similarly to the second embodiment, it is possible to moderate the open area of the third passage as a whole while also keeping the thickness of the boundary layer 30 at the downstream end of the partition 24 within a predetermined range. Note that, similarly to the first embodiment, at least one slit 248 may be disposed to open within the entrance length L0 or L1 from the downstream end of the partition 24 in the axial direction of the intake pipe 20. Also, to moderate the thickness of the boundary layer 30 at the downstream end of the partition 24, the slit 248 positioned farthest downstream preferably does not couple with (open to) the downstream end of the partition 24, but instead is located at a predetermined position distanced upstream from the downstream end of the partition 24 (that is, does not open to the downstream end of the partition 24).

Since the rest of the configuration and other effects are the same as the first embodiment, a description is omitted.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

For instance, the channel closed by the TGV may also be the second passage. Also, in the above embodiments, the control valve inside the intake pipe is taken to be a TGV to strengthen the tumble flow, but may also be a swirl control valve to strengthen the transverse vortex flow (swirl flow), or another type of valve. A throttle valve may also be provided with the function of a TGV or swirl control valve. In the above embodiments, the internal combustion engine is taken to be a four-stroke engine, but the disclosure may also be applied to an intake device of a two-stroke engine.

The main body of the partition may also have a curved three-dimensional shape, a blade-shaped cross-section, or the like. Also, the position at which to inject fuel in the intake pipe may be upstream or downstream of the partition. Also, the engine is not limited to being one that injects fuel into the intake pipe, and the disclosure may also be applied to an intake device of an engine that injects fuel directly into the combustion chamber. In other words, the gas passing through the intake pipe is not limited to an air-fuel mixture, and may also be air. In addition, the disclosure is applicable to an intake device of not only an engine that uses gasoline or diesel as fuel, but also an engine that uses natural gas or the like. Furthermore, the disclosure is applicable to an intake device of not only the engine of an automobile, but also the engine of a ship or airplane.

According to embodiments of the disclosure as described above, by sucking in at least part of the boundary layer, the flow rate distribution of the vapor that passes through the second passage and is suctioned into the combustion chamber is stabilized, thereby making it possible to improve the ability to control the gas flow inside the combustion chamber.

The invention claimed is:

1. An intake device of an internal combustion engine, comprising:
   a partition that divides an interior of an intake pipe that couples with a combustion chamber into a first passage and a second passage, the first passage being on an upper side of the partition and second passage being on a lower side of the partition;
   a control valve capable of opening and closing the first passage, the control valve being disposed on an upstream side of the intake pipe relative to the first passage and the second passage; and
   a third passage that opens at or near a coupling site between the partition and the intake pipe on an inner face of the second passage,
   wherein the third passage is configured to be capable of sucking in at least a part of a boundary layer produced at or near the coupling site by a vapor flowing through the second passage in a state in which the control valve is working in a direction of closing the first passage.

2. The intake device of the internal combustion engine according to claim 1, wherein the internal combustion engine is a spark-ignition engine, and
   wherein taking a turbulent intensity to be a flow rate fluctuation of an intake in an interior of the combustion chamber immediately before ignition in the state in which the control valve is working in the direction of closing the first passage, a width of an opening of the third passage in a direction at a right angle to an axial direction of the intake pipe is a width that produces the turbulent intensity greater than the turbulent intensity produced in a case in which the third passage is not provided.

3. An intake device of an internal combustion engine, comprising:
   a partition that divides an interior of an intake pipe that couples with a combustion chamber into a first passage and a second passage;
   a control valve capable of opening and closing the first passage; and
   a third passage that opens at or near a coupling site between the partition and the intake pipe on an inner face of the second passage,
   wherein the third passage is configured to suck in at least a part of a boundary layer produced at or near the coupling site by a vapor flowing through the second passage in a state in which the control valve is working in a direction of closing the first passage, wherein a width of an opening of the third passage in a direction at a right angle to an axial direction of the intake pipe is greater than zero and less than 6.6 mm.

4. The intake device of the internal combustion engine according to claim 2, wherein the width of the opening of the third passage in the direction at the right angle to the axial direction of the intake pipe is greater than zero and less than 6.6 mm.

5. The intake device of the internal combustion engine according to claim 1, wherein taking an entrance length to be a distance in an axial direction of the intake pipe along which a turbulent boundary layer develops near the coupling site until a distribution in a radial direction of a flow rate of the vapor in the second passage becomes constant, an opening of the third passage is located within the entrance length from a downstream end of the partition in the axial direction of the intake pipe.

6. The intake device of the internal combustion engine according to claim 2, wherein taking an entrance length to be a distance in the axial direction of the intake pipe along which a turbulent boundary layer develops near the coupling site until a distribution in a radial direction of a flow rate of the vapor in the second passage becomes constant, the pening of the third passage is located within the entrance length from a downstream end of the partition in the axial direction of the intake pipe.

7. An intake device of an internal combustion engine, comprising:
    a partition that divides an interior of an intake pipe that couples with a combustion chamber into a first passage and a second passage;
    a control valve capable of opening and closing the first passage; and
    a third passage that opens at or near a coupling site between the partition and the intake pipe on an inner face of the second passage, wherein
    the third passage is configured to suck in at least a part of a boundary layer produced at or near the coupling site by a vapor flowing through the second passage in a state in which the control valve is working in a direction of closing the first passage,
    wherein an opening of the third passage is located within a distance that is 40 times an average diameter of the second passage from a downstream end of the partition in an axial direction of the intake pipe.

8. The intake device of the internal combustion engine according to claim 2, wherein the opening of the third passage is located within a distance that is 40 times an average diameter of the second passage from a downstream end of the partition in an axial direction of the intake pipe.

9. The intake device of the internal combustion engine according to claim 1, wherein the third passage is a gap coupling the first passage and the second passage and located in the coupling site or near the coupling site in the partition.

10. The intake device of the internal combustion engine according to claim 2, wherein the third passage is a gap coupling the first passage and the second passage and located in the coupling site or near the coupling site in the partition.

11. The intake device of the internal combustion engine according to claim 1, wherein the third passage is holes in the partition that penetrate near the coupling site.

12. The intake device of the internal combustion engine according to claim 2, wherein the third passage is holes in the partition that penetrate near the coupling site.

13. The intake device of the internal combustion engine according to claim 11, wherein at least some of the holes are located within a range of 6.4 mm from the coupling site in a direction at a right angle to an axial direction of the intake pipe.

14. The intake device of the internal combustion engine according to claim 12, wherein at least some of the holes are located within a range of 6.4 mm from the coupling site in a direction at a right angle to an axial direction of the intake pipe.

15. The intake device of the internal combustion engine according to claim 1, wherein the third passage is slits in the partition that extend toward the coupling site.

16. The intake device of the internal combustion engine according to claim 2, wherein the third passage is slits in the partition that extend toward the coupling site.

17. The intake device of the internal combustion engine according to claim 15, wherein a width of each of the slits is greater than zero but not more than 2.1 mm, and
    wherein a lengthwise dimension of each of the slits is greater than 2.1 mm but not more than 10 mm.

18. The intake device of the internal combustion engine according to claim 16, wherein a width of each of the slits is greater than zero but not more than 2.1 mm, and
    wherein a lengthwise dimension of each of the slits is greater than 2.1 mm but not more than 10 mm.

19. The intake device of the internal combustion engine according to claim 1, wherein the partition includes an upstream part, a midstream part, and a downstream part,
    wherein a width of the upstream part is less than a width of the midstream part, the width being in a direction at a right angle to an axial direction of the intake pipe.

20. The intake device of the internal combustion engine according to claim 19, wherein the width of the midstream part increases proceeding from the upstream side to a downstream side of the intake pipe.

* * * * *